April 30, 1968 K. SIEBERTZ ET AL 3,380,154

UNIPOLAR DIFFUSION TRANSISTOR

Original Filed Nov. 24, 1959

Inventors.
Karl Siebertz, &
Richard Wiesner.
By Hill & Hill Attys

United States Patent Office 3,380,154

Patented Apr. 30, 1968

3,380,154

UNIPOLAR DIFFUSION TRANSISTOR

Karl Siebertz, Munich-Obermenzing, and Richard Wiesner, Munich, Germany, assignors to Siemens Aktiengesellschaft, Munich, Germany, a corporation of Germany Original application Nov. 24, 1959, Ser. No. 855,171, now Patent No. 3,152,294, dated Oct. 6, 1964. Divided and this application Sept. 10, 1964, Ser. No. 395,450
6 Claims. (Cl. 29—571)

ABSTRACT OF THE DISCLOSURE

A process of producing unipolar transistors in which a doping material producing the opposite conduction type is diffused into the surface of a low resistance semiconductor crystal, and if desired also diffusing a second doping material producing the same conduction type therein, to respectively form a thin surface zone or thin intermediate zone of high resistance, contacting said high resistance zone with two barrier free electrodes and contacting one of the zones of the crystal by an electrode disposed between said two electrodes.

*The disclosure*

This invention is concerned with a unipolar diffusion transistor comprising a semiconductor body having two main electrodes substantially barrier-free provided thereon, and a semiconductor zone (control zone) connected with a control electrode upon one side of the current path, the conductivity type of which is opposite to that of the semiconductor body extending between the main electrodes. This application is a division of our copending application Ser. No. 855,171 filed Nov. 24, 1959 for Unipolar Diffusion Transistor, now United States Patent No. 3,152,294, granted Oct. 6, 1964.

The various objects and features of the invention will appear in the course of the description of embodiments which will be rendered below with reference to the accompanying diagrammatic drawings.

In a unipolar transistor, the resistance of the current path between the two main electrodes is in known manner governed by variation of the operatively effective cross-sectional area. The path of penetration of the space charge zone forming at the control zone, which is against the semiconductor body biased in blocking direction, is charged according to the voltage connected thereto. The provision of two control zones positioned oppositely upon the current conducting semiconductor body increases the control effect. An arrangement of this kind is shown in FIG. 1.

Figure 1:
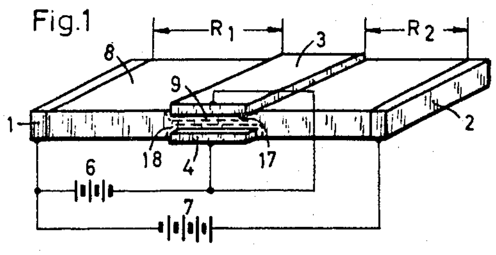
FIG. 1 illustrates parts of a unipolar transistor to aid in explaining how the resistance of the current path between the two main electrodes is governed by varying the operatively effective cross-sectional area thereof.

Referring now to FIG. 1, numeral 8 indicates a relatively high ohmic n- or p-conducting semiconductor rod on which are provided zones 3 and 4 forming a pn-junction, such zones being with respect to the semiconductor rod biased in blocking direction. Depending upon the magnitude of the bias, the space charge zones 17 and 18 of the pn-junctions will more or less spread within the current path and can finally completely overlie such path. Since the space charge zone is always high ohmic against the current path of the semiconductor, a variation of the space charge width will constitute narrowing or widening of the current path. The two main electrodes 1 and 2 are respectively referred to as source electrode 1 and as suction electrode 2; 3 and 4 are the control zones. The majority carrier current, supplied from the voltage source 7 and flowing between 1 and 2, is modulated ahead of the control zones, in the manner of current narrowing control, by the space charges which depend upon the control voltage of the voltage source 6.

In order to produce such arrangements, it has been proposed to provide the control zones by alloying. In accordance with another proposal, a circular rod, for example, germanium, is by anodic treatment in an electrolyte within a certain area etched off to a small diameter and a metallic coating to act as an electrode is thereupon electrochemically deposited. The result is in each case a mechanically extraordinarily sensitive system; moreover, the necessary heat dissipation presents considerable difficulties. It is in addition practically impossible to make the current path with these procedures as thin as required for high limit frequencies, that is, from a few microns to fractions of microns.

In order to make this possible, the invention proposes a unipolar transistor comprising a semiconductor body of predetermined conductivity type and relatively low resistance upon which is by diffusion produced a thin zone of opposite conductivity type and high resistance, which zone is provided at each end thereof with a main electrode.

The thoughts underlying the invention therefore contemplate, to start with a relatively thick crystal rod with a thickness, for example, of 1 millimeter, and to produce the narrow current path of the indicated thickness by diffusion. The remaining relatively thick support provides for great mechanical strength and for good heat dissipation.

Some particularly favorable embodiments according to the invention are shown in FIGS. 2 to 7. In order to increase the control action upon the thin zone 9 which is contacted by the main electrodes 1 and 2, there is provided a second thin control zone 3 connected with a control electrode.

Figure 2:
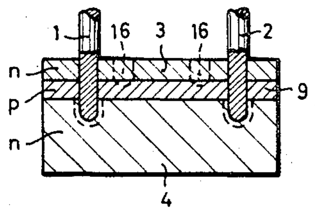
FIGS. 2 to 7 show particularly favorable embodiments of the invention.

In FIG. 2, numeral 4 indicates a semiconductor body which is, for example, n-conductive and approximately 1 millimeter thick. Upon such body is provided, by diffusion, a very thin p-conductive layer 9 with a thickness varying from a few microns to fractions of a micron, and in addition thereto an n-conductive layer 3 in area corresponding to that of the p-layer 9. The source electrode 1 and the suction electrode 2, which contact the layer 9 barrier-free, are made, for example, of aluminum wire. The two n-conductive zones 3 and 4 are the control zones which are connected with a control electrode and which produce in the p-conducting layer 9 a space charge depending upon the voltage supplied thereto, thus governing the operatively effective cross section of the current path 9. The portions 16 of the n-conductive layer 3 are removed, for example, by etching or mechanically, so as to avoid short circuiting the control zone 3 with the main electrodes 1 and 2.

Figure 3:
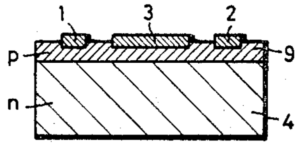

The arrangement shown in FIG. 3 comprises a semiconductor body 4 which is, for example, n-conductive and also operates as control zone, a thin p-conductive layer 9 being provided upon the body 4 by diffusion. The second n-conductive control zone 3 which is of smaller area than the layer 9 and the two main electrodes 1 and 2 are produced by vaporization and by alloying-in, aluminum, for example, being used for producing the main electrodes 1 and 2 and gold-antimony, for example, being used for producing the n-doped control zone 3.

The control zone 3 can also be provided by diffusion after covering the areas of the semiconductor surface, which are to remain unaltered, in known manner by "masking," for example, with an oxide coating.

The arrangements according to the invention have also the advantage that disturbing series resistances can be kept low. Among these resistances are the resistance at the input side between the source electrode 1 and the control zone, indicated in FIG. 1 by $R_1$ and the corresponding resistance $R_2$ at the output side between the suction electrode 2 and the control zone. The resistance $R_1$ affects the limit frequency while $R_2$ increases the required suction voltage, to be supplied by the voltage source 7, as well as the effective loss.

Figure 4:
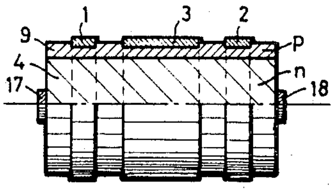
Figure 5:
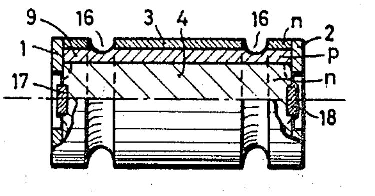

As shown in FIGS. 4 and 5, the structures according to FIGS. 2 and 3 can also be arranged circumferentially along the generatrix of a cylinder. In these arrangements according to the invention, the zone 9 is formed by the generatrix the cylinder 4 which by itself forms a control zone provided with control electrodes 17 and 18, the second control zone 3 and the two main electrodes 1 and 2 embracing the zone 9 in ring-like manner. The main electrodes 1 and 2 can however be disposed ring-like at the opposite ends of the cylindrical zone 9, as shown in FIG. 5. The ring 3 forming in FIG. 4 the second control zone and the rings forming the two main electrodes 1 and 2 are again produced by vaporization and alloying-in of the corresponding substances. In FIG. 5, the second control zone 3 which surrounds the entire cylindrical zone 9 is produced at the time of producing the zone 9. Parts 16 are again removed from the outer cylinder material 3, by etching or mechanically, so as to avoid short circuit between the control zone 3 and the main electrodes 1 and 2.

Figure 6:
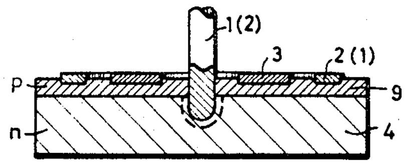

FIG. 6 shows a central-symmetrical arrangement of parts. In this embodiment, a control zone 4 is formed as a circular disk carrying upon one of its sides a thin zone 9 while the second control zone 3 as well as the two main electrodes 1 and 2 are provided upon the zone 9 central-symmetrically in the form of concentric annular rings. The source electrode and the suction electrode can be exchanged in this arrangement. One of the main electrodes, centrally disposed, consists, for example, of alloyed-in aluminum wire; the second main electrode consisting of an aluminum ring which is vaporized and alloyed-in, and the second control zone 3 consists of a gold-antimony ring which is likewise vaporized and thereupon alloyed-in. The inhomogeneous field conditions resulting from geometry along the current path can thereby be beneficially utilized and disturbing marginal zones of the control zones 3 and 4 can be in simple manner avoided. For example, if the source electrode 1 is, for example, disposed centrally and the suction electrode in the form of a ring is disposed near the periphery, the constriction or narrowing along the current path will take place along a wide zone underneath the annular control zone 3, thereby increasing the steepness of the arrangement. Disposal of 1 peripherally and of 2 centrally will on the other hand result in a particularly low series resistance $R_1$ at the input side.

Figure 7:
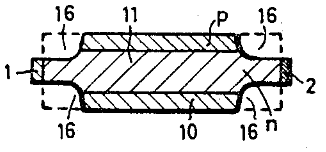

The arrangement according to FIG. 7 utilizes a circular cylindrical rod 11 provided with a relatively thin outer diffusion layer 10 forming a control zone. By etching off parts at 16 and providing the main electrodes 1 and 2 in the above explained manner, there will again be obtained a mechanically stable system operable as a unipolar transistor which also provides for favorable heat dissipation.

In the embodiments shown in FIGS. 2 to 6, the support 4 can be coupled with the outer control zone 3, so as to obtain an increased control effect, or a fixed direct voltage may be connected thereto acting in blocking direction as against the current path. Variation of this blocking bias will modify the control effect of the outer control zone, permitting regulation action in the manner of a regulation tube (with variable grid pitch). The outer control zone 3 and the support 4 can also be supplied with alternating voltages of different frequencies so as to obtain frequency mixture.

Some methods shall now be discussed for producing a unipolar transistor according to the invention.

In carrying out the thoughts underlying the invention, it must be considered that the current path must be relatively high ohmic, since the depth of penetration of the space charge zone within the semiconductor body is inversely proportional to the impurity center concentration present therein. Accordingly, special requirements must be fulfilled in the diffusion, which are different from those to be observed in the production of transistors, rectifiers or photocells which always call for low ohmic diffusion layers. The structures required for unipolar transistors according to the invention may be obtained, for example by simultaneous or successive diffusion of a donator or acceptor, that is, in accordance with the so-called double or dual diffusion method. In such method, there is produced upon a low ohmic semiconductor body 4 of a thickness amounting to about 1 millimeter, by double diffusion, a thin high ohmic zone 9 with conductivity type opposite to that of the semiconductor body 4, and a low ohmic zone 3 of a conductivity type corresponding to that of the semiconductor body. The parts 16 of the zone 3 are removed, especially by etching, prior to or after providing the electrodes 1 and 2, by vaporization and alloying-in, so as to avoid short circuiting.

In the double or dual diffusion method, a silicon mono crystal wafer 4, which may, for example, be n-conductive, is subjected to an atmosphere of antimony (donator) and aluminum (acceptor). Aluminum diffuses into the semiconductor body approximately 100 times faster than antimony. Antimony accordingly appears on the surface of the semiconductor body with 100 times higher concentration than the aluminum which migrates quickly into the interior of the semiconductor body. There is thus formed upon the surface of the semiconductor body an n-doped layer 3 and underneath thereof a p-doped layer 9.

Figure 8:
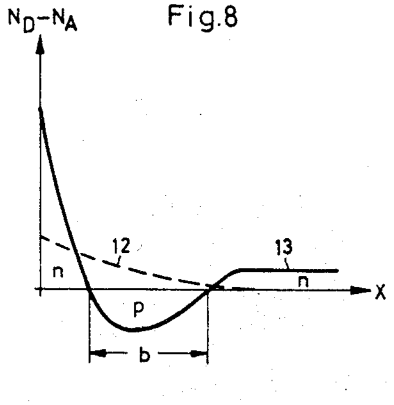
FIGS. 8 and 9 are curves explaining the course of concentration of added doping substances, for example, donator substances and the course of concentration resulting therefrom.

The resulting concentration course is indicated in FIG. 8 by curve 13. The n-doping predominates directly upon the surface. There is thus obtained a strongly n-doped layer 3 and somewhat deeper in the crystal is formed a narrow zone 9 in which the quickly penetrating acceptors predominate and produce a p-conducting layer while the original donator density determines the conductivity character in the interior of the crystal 4, that is, the crystal exhibits weak n-doping.

Figure 9:
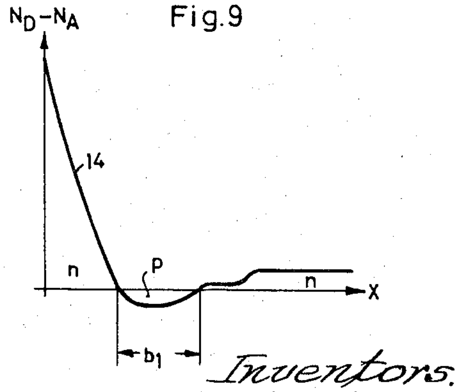

In order to obtain with the double or dual diffusion method a high ohmic current path, an additional quickly diffusing impurity substance of the same type as the basic doping of the crystal 4 can be diffused-in simultaneously or in a separate operation (threefold diffusion). The concentration course of the additional doping substance (for example, donator), is indicated in FIG. 8 by the dash line curve 12. In FIG. 9 curve 14 indicates the resulting concentration course. It will be seen that the doping of the p-zone, that is, of the current path 9, is now considerably less and that the width of this p-zone has been reduced by the additional doping substance.

A semiconductor arrangement according to the invention can however also be produced by simple-diffusion and subsequent vaporization and alloying-in of the second control zone 3 and the main electrodes 1 and 2. There is in such case produced upon a low ohmic semiconductor body 4, about 1 millimeter thick, especially by diffusion, a thin high ohmic semiconductor zone 9 with conduction type opposite to that of the semiconductor body. A low ohmic zone 3 with a conductivity type corresponding to that of the semiconductor body 4, and two electrodes 1 and 2 which contact the zone 9 in barrier-free or non-blocking manner, are thereupon vaporized and alloyed-in. (FIGS. 3, 4, 6.)

The high diffusion layer is obtained in the combined diffusion and vaporization method, by low supply of impurity substance from the gas phase or by subsequent removal (etching or grinding off) of the low ohmic part of the diffusion layer. The layer procedure results in a steeper pn-junction in the direction of the support than the former.

Instead of producing the thin zone 9 by diffusion, it may be produced in all cases noted by removal vaporization, which requires, however, that the semiconductor material contain a sufficiently easily vaporizable doping partner.

This method, as compared with previously proposed methods, makes it possible to obtain very thin current paths which are well defined as to thickness, without adversely affecting mechanical stability, giving moreover the possibility for favorable heat dissipation.

The invention is adapted for producing a semiconductor arrangement according to copending application Ser. No. 818,125 filed Mar. 3, 1954, now Patent No. 2,933,619. In such arrangement, one of the control zones takes over the function of the source, the other that of the suction electrode, while the control is effected from 1 and 2. The bias voltage at the control zones must be such that there is formed an extended space charge zone with a pronounced potential hill the height of which is governed by the control zones. In this case, the spacing between the electrodes 1 and 2 must be kept small as compared with the first described embodiments. However, a small spacing between the control zones, of a few microns, is desirable and the diffusion method is very well adapted to provide it.

Changes may be made within the scope and spirit of the appended claims which define what is believed to be new and desired to have protected by Letters Patent.

We claim:

1. A method of producing a unipolar transistor comprising taking a semiconductor body having a relatively low resistance and a thickness on the order of about 1 millimeter, producing upon such semiconductor body by multiple diffusion a thin zone having a relatively high resistance and being of a conductivity type opposite to that of said semiconductor body and a zone having a relatively low resistance and being of a conductivity type corresponding to that of said semiconductor body, forming electrodes on the structure by vaporization and alloying-in, and removing parts of said zone having relatively low resistance to prevent short circuiting of parts.

2. A method according to claim 1, wherein the thickness of said zone having relatively high resistance is on the order of 0.1 to 100 microns.

3. A method according to claim 2, wherein parts of said zone having relatively low resistance are removed by etching off the corresponding parts.

4. A process for the production of a unipolar transistor by diffusion of acceptor and donator atoms into a surface of a low resistance semi-conductor crystal of the p-type or n-type while forming two pn-junctions extending parallel to such semi-conductor surface, comprising the steps of effecting diffusion of the acceptor and donator atoms, adjusting the concentrations thereof, with respect to the doping of the semi-conductor base crystal, to produce a high resistance in the zone of the opposite conduction type to the base crystal and a low resistance in the zone of the conduction type of the base material bordering thereon in the direction of the semi-conductor surface, contacting the intermediate high resistance, relatively thin zone of the opposite conduction type with two electrodes in barrier-free manner arranged in spaced relation, contacting at least one of the zones of the conduction type of the base material with a barrier-free control electrode and diffusing into the semiconductor crystal additional doping atoms of the same type as the base crystal to effectively reduce the thickness of the high resistance zone.

5. A process according to claim 4, in which a semiconductor disk of approximately 1 mm. thickness is utilized as the semi-conductor base crystal, and effecting the diffusion process until said thin zone of the opposite conduction type exhibits a thickness of 0.1–100 microns.

6. A process according to claim 4, in which the two zones referred to are produced through simultaneous diffusion of acceptor and donator atoms in the low resistance semi-conductor base crystal.

References Cited

UNITED STATES PATENTS

| | | | |
|---|---|---|---|
| 2,814,853 | 12/1957 | Paskell. | |
| 2,861,018 | 11/1958 | Fuller | 148—189 |
| 2,952,896 | 9/1960 | Cornelison | 29—583 |
| 2,967,985 | 1/1961 | Shockley | 148—189 X |
| 3,041,213 | 6/1962 | Anderson | 148—189 X |
| 3,010,033 | 11/1961 | Noyce | 317—235 X |
| 3,148,284 | 9/1964 | Wertwijn | 317—234 X |

WILLIAM I. BROOKS, *Primary Examiner.*